(12) United States Patent
Shimasaki et al.

(10) Patent No.: US 6,578,649 B1
(45) Date of Patent: Jun. 17, 2003

(54) HYBRID VEHICLE

(75) Inventors: Yuichi Shimasaki, Saitama (JP); Hiromi Inagaki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/478,806

(22) Filed: Jan. 7, 2000

(30) Foreign Application Priority Data

Feb. 24, 1999  (JP) ............................................. 11-047245

(51) Int. Cl.⁷ ................................................ B60K 6/04
(52) U.S. Cl. ...................... 180/65.2; 180/65.4; 180/65.8
(58) Field of Search ............................... 180/65.1, 65.2, 180/65.3, 65.4, 65.8

(56) References Cited

U.S. PATENT DOCUMENTS

| | | | | |
|---|---|---|---|---|
| 3,205,966 A | * | 9/1965 | Landers ...................... | 180/65.4 |
| 4,165,795 A | * | 8/1979 | Lynch et al. ............... | 180/65 A |
| 4,438,342 A | * | 3/1984 | Kenyon ....................... | 290/45 |
| 4,923,025 A | * | 5/1990 | Ellers ........................ | 180/65.2 |
| 5,346,031 A | * | 9/1994 | Gardner ..................... | 180/65.4 |
| 5,495,906 A | * | 3/1996 | Furutani .................... | 180/65.2 |
| 5,635,805 A | * | 6/1997 | Ibaraki et al. ............. | 180/65.4 |
| 5,697,466 A | * | 12/1997 | Moroto et al. ............. | 180/65.2 |
| 5,698,905 A | * | 12/1997 | Ruthlein et al. ........... | 180/65.4 |
| 5,934,396 A | * | 8/1999 | Kurita ........................ | 180/65.2 |
| 6,019,183 A | * | 2/2000 | Shimasaki et al. ......... | 180/65.4 |
| 6,020,697 A | * | 2/2000 | Shimasaki et al. ......... | 180/65.4 |
| 6,044,922 A | * | 4/2000 | Field .......................... | 180/65.2 |
| 6,044,923 A | * | 4/2000 | Reagan et al. ............. | 180/65.4 |
| 6,116,364 A | * | 9/2000 | Taguchi et al. ............ | 180/65.2 |
| 6,176,336 B1 | * | 1/2001 | Bourne et al. ............. | 180/197 |

FOREIGN PATENT DOCUMENTS

| | | |
|---|---|---|
| JP | 8-237811 | 9/1996 |
| JP | 9-140006 | 5/1997 |

* cited by examiner

*Primary Examiner*—Avraham Lerner
(74) *Attorney, Agent, or Firm*—Arent Fox Kintner Plotkin & Kahn

(57) ABSTRACT

A hybrid vehicle includes an engine for driving front wheels; a generator 6 for generating at 42V; a battery 11 adapted to be charged with a generated output from the generator 6; motors 8 for driving rear wheels with a generated output from the generator 6; a direct-current voltage converter 12 for allowing the generated output to step down to a voltage of 14V; and a battery 13 for accessories and an electric load 14, the battery being adapted to be supplied with electric power at the voltage allowed to step down by the direct-current voltage converter 12.

5 Claims, 5 Drawing Sheets

HYBRID VEHICLE

BACKGROUND OF THE INVENTION

1. Field of the Invention

The present invention relates to a hybrid vehicle, and in particular to a hybrid vehicle of 4 wheel-drive (4WD) type in which front wheels are driven by an engine, while rear wheels are driven by motors.

2. Description of the Related Art

Conventionally known is a hybrid vehicle in which the driving force of an engine is assisted by motors. Among hybrid vehicles of this type there exists a parallel hybrid vehicle in which a motor/generator is provided in parallel with an engine, whereby in acceleration of the vehicle the motor/generator is operated as a motor for assisting the engine, while in deceleration of the vehicle the motor/generator is operated as a generator for charging the battery (for instance, refer to Japanese Unexamined Patent Publication No. HEI 9-140006 which discloses a similar technology). In addition, a simple hybrid vehicle is studied in which a few improvements are carried out on a mass-produced gasoline-fueled vehicle such that rear wheels thereof are rendered assist by motors which are run by a conventional 12V battery.

Then, as is disclosed in Japanese Unexamined Patent Publication No. HEI 8-237811, there is provided a hybrid vehicle in which a 12V battery is charged with electric power obtained by driving a generator with an engine, and rear motors are driven with the electric output power of the battery, wherein there are disposed two such batteries, whereby in normal driving, the two batteries are used in parallel (12V), while in running the motors at high revolutions, the two batteries are connected in series (24V) to increase the driving voltage.

With the first related art hybrid vehicle in which the motor/generator is provided, however, since the motor/generator is selectively used as a motor or a generator, there is caused a problem that driving of the vehicle and generation of electricity cannot be performed simultaneously. In addition, for instance, with a front engine vehicle, the motor/generator is coupled to a front-mounted engine and thus it has to be disposed at a front side of the vehicle, this causing a problem that the degree of freedom in layout becomes low.

On the other hand, in the second related art simple hybrid vehicle in which the rear wheels are rendered assist by the motors, since the motors are driven at 12V, the motor current becomes large, and power loss in wires becomes great, this therefore causing a problem that wiring has to be implemented using thick wires.

Then, with the third related art rear wheel assisted type hybrid vehicle, the motor driving voltage can be increased, but since the generator remains at the low voltage, this also suffers from the aforesaid problem of large power loss throughout the wiring.

SUMMARY OF THE INVENTION

Thus, an object of the present invention is to provide a hybrid vehicle that can provide a high degree of freedom in layout as a hybrid vehicle and which can obviate the necessity of using thick wires for wiring by increasing the voltage.

With a view to attaining the above object, there is provided a hybrid vehicle including an engine (for instance, an engine 2 described in a mode of operation of the present invention that will be described hereinafter) for driving first driving wheels, a generator (for instance, a generator 6 in the mode of operation of the invention) adapted to be driven by the engine for generation at a first voltage (for instance, 42V described in the same mode); a first battery (for instance, a battery 11 in the mode of operation of the invention) adapted to be charged with a generated output from the generator; motors (for instance, motors 8 described in the mode of operation of the invention) for driving second driving wheels (for instance, rear wheels 7 in the same mode) with a generated output from the generator; a direct-current voltage converter (for instance, a direct-current voltage converter 12 described in the mode of operation of the invention) for allowing the generated output to step down to a second voltage (for instance, 14V described in the same mode) that is lower than the first voltage; and a second battery (for instance, a battery 13 for accessories described in the mode of operation of the invention) and an electric load (for instance, an electric load 14 described in the same mode), the second battery being adapted to be supplied with electric power at the voltage allowed to step down by the direct-current voltage converter.

According to the construction described above, when the engine is driven, the generator allows the motors to drive the second-driving wheels at the first voltage which is higher than the second voltage to thereby give assist to the engine. Then, the generated output of the generator is caused to step down to the second voltage by means of the direct-current voltage converter and the voltage so caused to step down is then supplied to the second battery for distribution to various types of electric loads.

Further, driving by the motors can be stopped when the motors are detected as abnormal.

With this construction, even when the motors are in an abnormal state, the second battery and the electric load can be supplied as usual with electric power via the direct-current voltage converter.

DETAILED DESCRIPTION OF THE PREFERRED EMBODIMENTS

Figure 1:
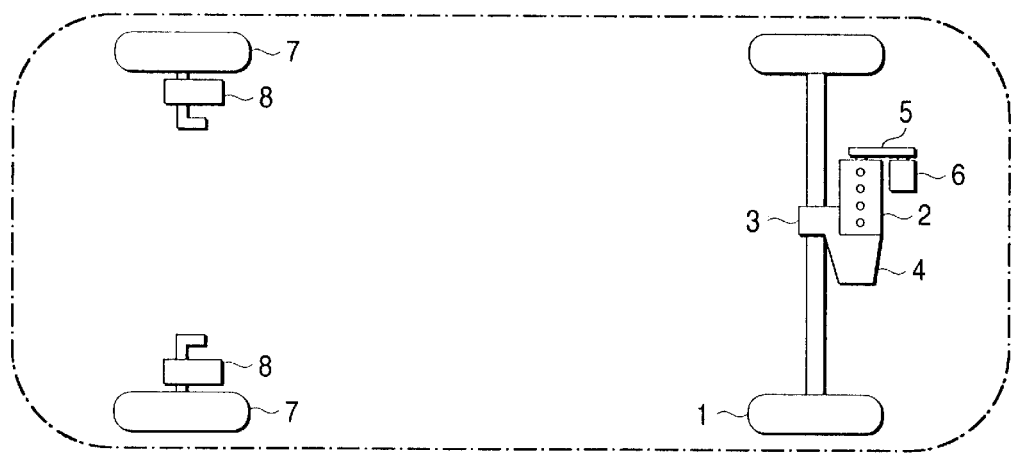
FIG. 1 is an explanatory plan view showing a layout of a first embodiment of the present invention.

Referring to the drawings, a mode of operation of the present invention will be described below.

FIG. 1 is an explanatory plan view showing a layout of a hybrid vehicle according to a first mode of operation of the invention. In FIG. 1, reference numeral 1 denotes front wheels, which are driven by an engine via a differential gear 3 and a transmission 4. A generator (alternator) 6 is coupled to the engine 2 via a belt 5. On the other hand, reference numeral 7 denotes rear wheels, which are driven by means of motors 8 coupled, respectively, to the left and right rear wheels 7. The motors 8 are constructed to be driven by virtue of a generated power from the generator 6 so as to drive the rear wheels 7.

Figure 2:
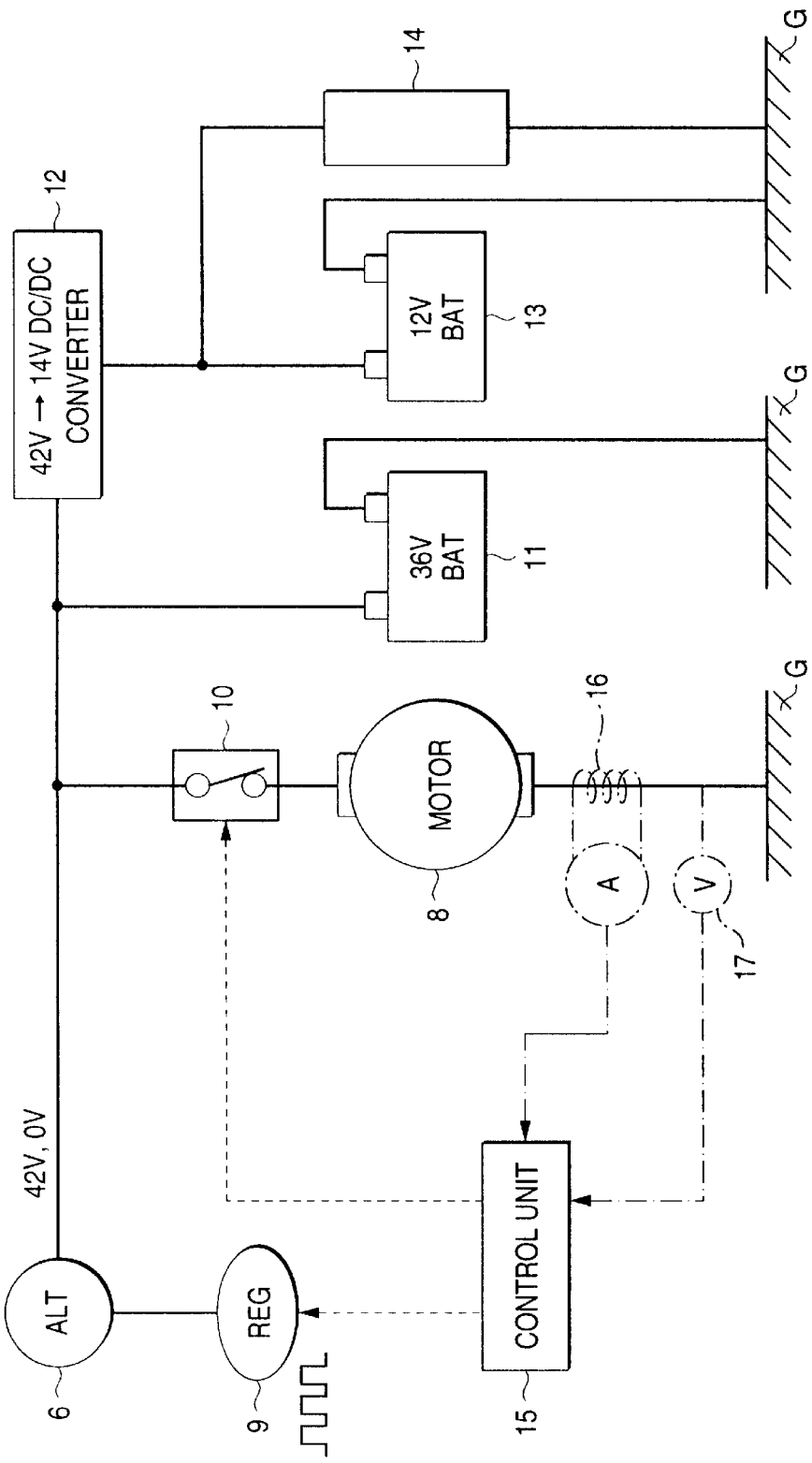
FIG. 2 is an electric wiring diagram showing the first and second embodiments of the present invention.

Shown in FIG. 2 is an electric wiring diagram of the hybrid vehicle described above. In FIG. 2, the construction of the generator 6 is identical with that of an alternator equipped on a normal vehicle and it is constructed such that an output voltage therefrom can be regulated to a first voltage, which is such as 42V, via a regulator 9.

Connected, respectively, to the generator 6 are the motor 8, which is connected thereto via a switch 10, a 36V battery 11 and a direct-current voltage converter 12. Connected to the direct voltage converter 12 are a 12V battery 13 for accessories and an electric load 14 for such as headlamps and engine accessories. In addition, reference numeral 15 denotes a control unit, which is connected to the switch 10 and the regulator 9 for controlling the switch 10 and the regulator 9. Reference character G denotes grounds for the motors 8, the battery 11, the battery 13 for accessories and the electric load 14.

Thus, in needing assist, when the switch 10 is switched on and the engine 2 is driven, the generator 6 generates electricity at a voltage of 42V, and the motors 8 are driven. Thus, the engine 2 is rendered assist through driving of the rear wheels 7. At this time, if the generator 6 can generate a surplus, the 36V battery 11 is charged with a generated power from the generator 6, and the 12V battery 13 for accessories is charged with a voltage allowed to step down by the direct-current voltage converter 12. In addition, electric power is supplied to the electric load 14 via the 12V battery 13 for accessories.

If there is produced no surplus from the generator 6, the motors 8 are driven using a part of the output power from the battery 11. Here, the driving power of the motors 8 can be regulated by constructing the switch 10 with a transistor or the like and controlling the same switch through switching control, and on top of the regulation as described above, the driving power can be controlled by sending a regulation signal to the motor 8 (in the case of a separately excited motor, with a field current, and through switching control of an inverter in the case of an alternating current motor).

Then, in a case where a regeneration is needed, with the above switch 10 being left switched on, if the generator 6 is regulated to a low voltage (for instance, 0V) in which the battery 11 and the battery 13 for accessories are not charged, the battery 11 and the accessories battery 13 can be charged by virtue of regenerated energy by the motor 8. In addition, the generated power of the motor 8 can be controlled by sending a regulation signal to the motor 8 (in the case of the separately excited motor, with a field current, and through switching control of the inverter in the case of the alternating current motor).

Moreover, in the case of a normal driving in which neither regeneration nor assist is needed, when the switch 10 is switched off to stop the motors 8, the battery 11 and the accessories battery 13 can be charged by the generator 6.

Consequently, according to this embodiment, the engine 2 is driven to drive the generator 6 for generation, and simultaneously with this operation, the rear wheels 7 can be driven by virtue of a generated power from the generator 6. Thus, assist can be rendered to the engine 2 by the motors 8 even when the generator 6 is generating. In addition, the engine 2 and the generator 6 can be provided at the front side of the vehicle while the motors 8 can be disposed at the rear side. Thus, the degree of freedom in layout can be increased when compared with a case in which the engine 2, the generator 6 and the motors 8 are all provided at the front side of the vehicle.

Furthermore, since the motors 8 can be operated through a generation at 42V, thin wires can be used for wiring, whereby power loss can be reduced.

In addition, since the motors 8 are driven by a generated power from the generator 6, the 36V battery 11 is only rendered a function as a buffer, and due to this, a current taken from the battery 11 is reduced, this reducing a risk of the 36V battery 11 being deteriorated.

Furthermore, since the generated voltage of the generator 6 is set to 42V which is higher than the voltage of accessories, which is 12V, the generated power can be secured greatly relative to the size as a space occupied by the generator 6, thus making it possible not only to make the generator smaller in size, lighter in weight and lower in production costs thereof to that extent. Namely, since the voltages of on-board electric loads are unified as 12V, the generated voltage of the conventional generator 6 is regulated as 12V, but with the revolutions of the shaft of the generator 6 (which is in proportion to the revolutions of the engine) being sufficient, even if the generated voltage is increased, since the generated current does not drop, a great magnitude of generated power can be secured by increasing the generated voltage. Consequently, even with a generator 6 of the same size (generation capacity), a greater magnitude of generated power can be secured. Thus, a sufficient assist/regeneration electric power can be secured from the rear wheels 7.

Figure 3:
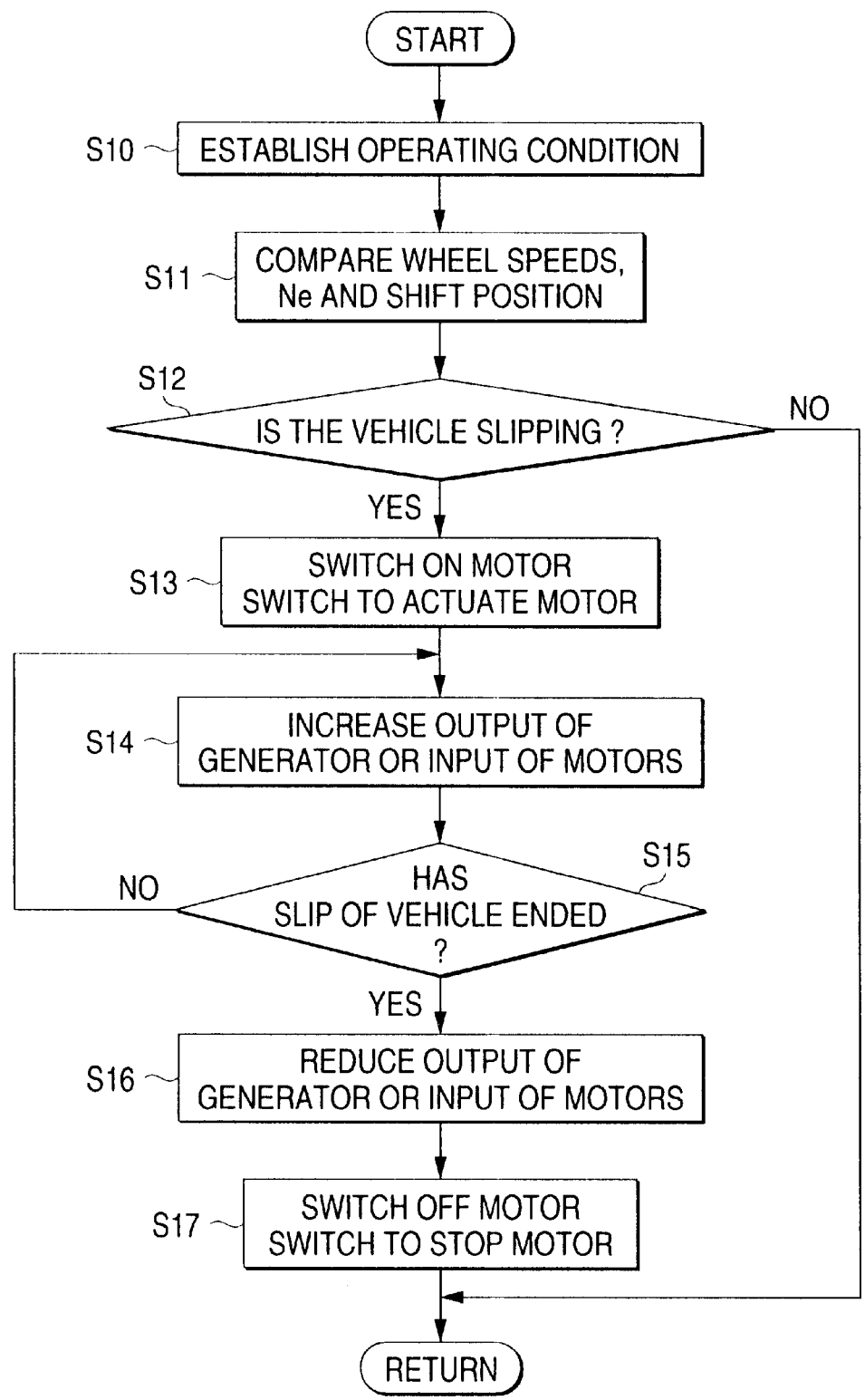
FIG. 3 is a flowchart showing an assist control carried out at the time of slippage.
Figure 4:
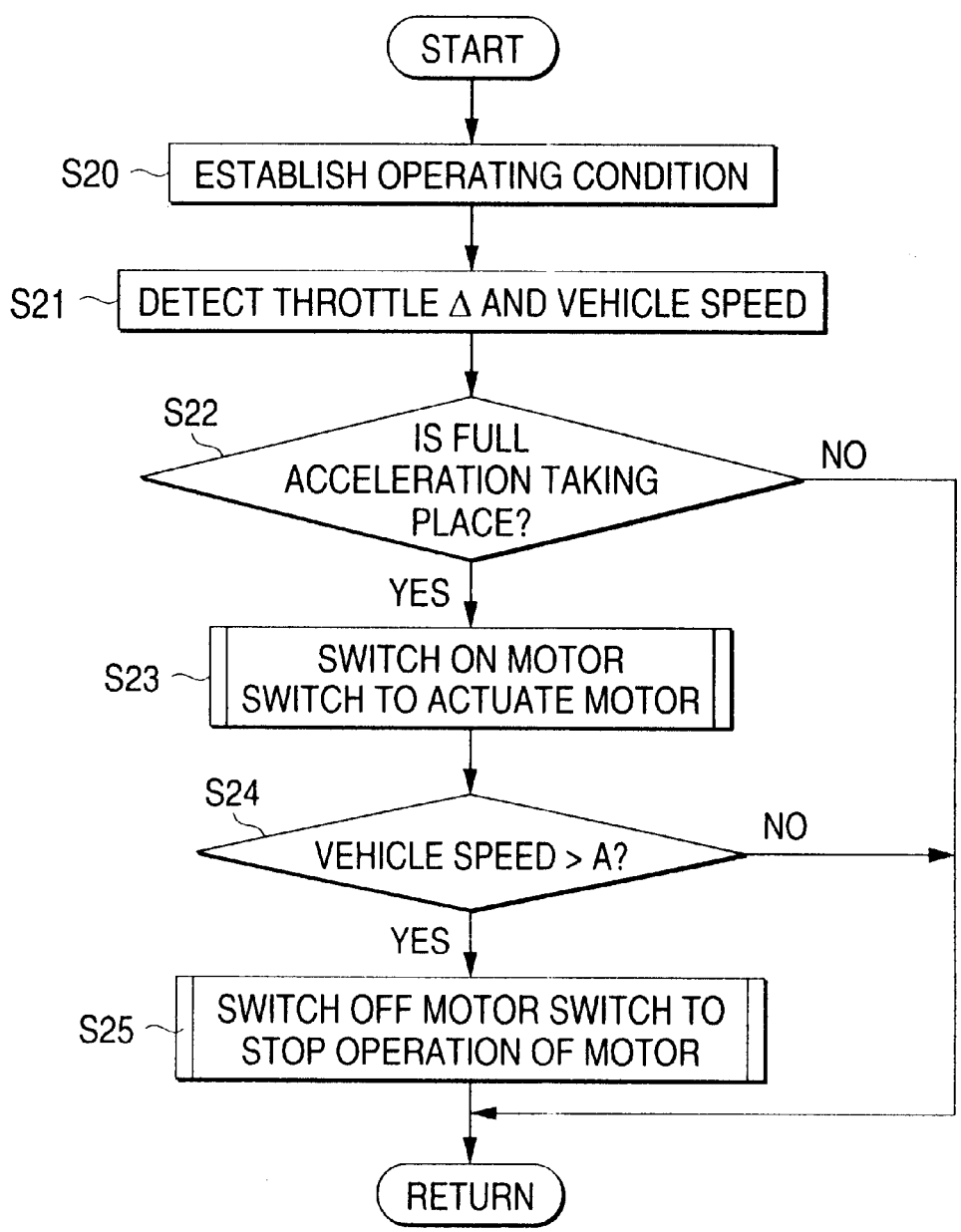
FIG. 4 is a flowchart showing an assist control carried out at the time of acceleration.
Figure 5:
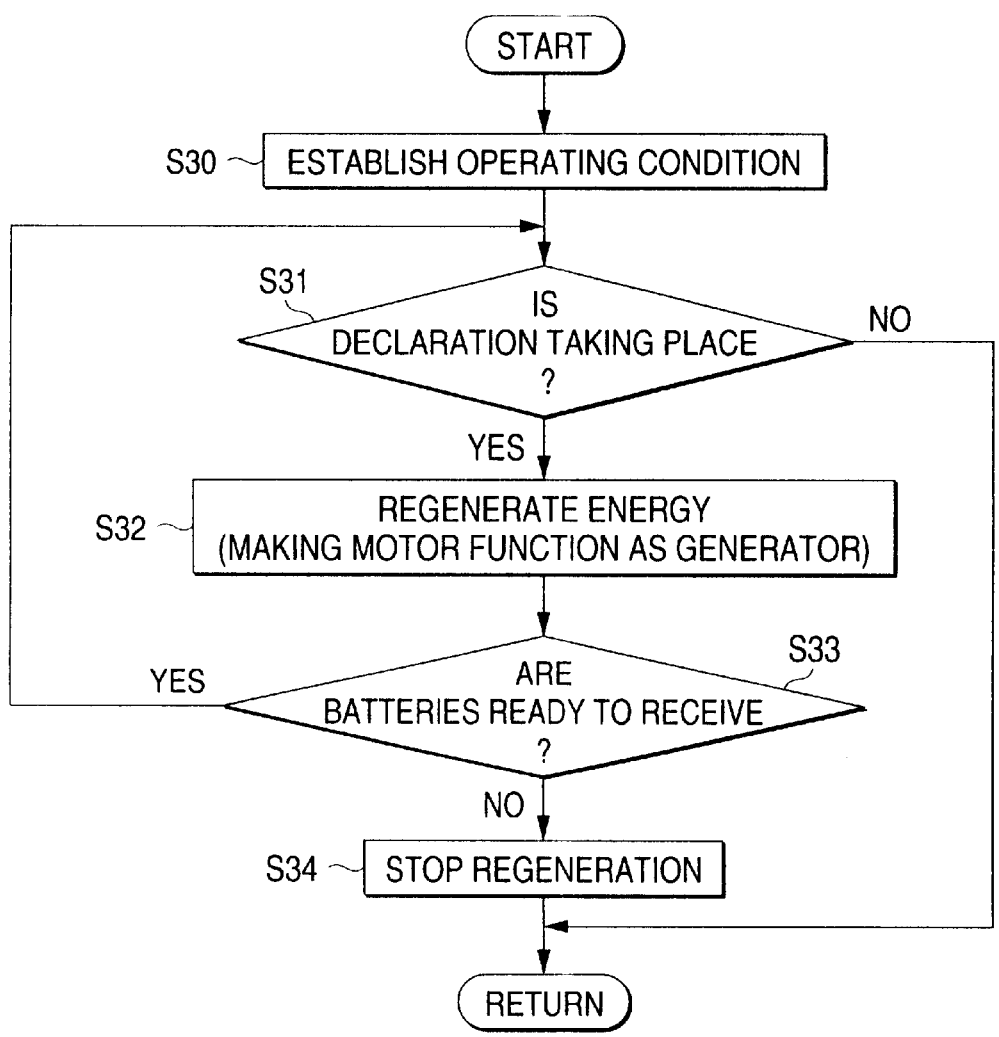
FIG. 5 is a flowchart showing a regenerative control.

Next, referring to flowcharts shown in FIGS. 3 to 5, an example of various types of control of the aforesaid hybrid vehicle will be described below.

Referring to the flowchart shown in FIG. 3, an assist control will be described which is carried out when there occurs a slippage. In Step S10, when the motors 8 and the generator 6 are confirmed as normal with the engine 2 being actuated and thus, an operating condition is established, in the following step S11, wheel speeds, engine revolutions Ne and shift position are compared, and In Step S12, whether or not the vehicle is slipping is judged. If the vehicle is judged as not slipping, the flowchart returns. On the contrary, when the vehicle is judged as slipping in Step S12, in Step S13, the switch 10 is switched on, and in Step S14, in response to the slip distance, either the output of the generator 6 or the input of the motors 8 is increased. In Step S15, whether or not the slipping of the vehicle has ended is judged.

In the event that in Step S15 the slip of the vehicle is judged as having ended, in Step S16, the output of the generator 6 is reduced or the input of the motors 8 is decreased, and in Step S17 the switch 10 is switched off, and the flowchart returns. On the contrary, in the event that in Step S15 the slip of the vehicle has not ended yet, the flowchart returns to Step S14, where the same process is repeated.

Consequently, in a case where the front wheels are slipping, the motors 8 are actuated and driven to be switched to a 4 wheel drive mode, where the vehicle can be promptly released from the slipping state.

Next, referring to the flowchart shown in FIG. 4, an assist control will be described which is carried out when accelerating the vehicle. In Step S20, when the motors 8 and the generator 6 are confirmed as normal with the engine 2 being actuated and thus, an operating condition is established, in Step S21 a variation Δ of the throttle opening angle and the vehicle speed are detected, and in Step 22 whether or not a full acceleration is being applied is judged. In the event that in Step S22 it is judged that the full acceleration is being taking place, in Step S23, the switch 10 is switched on so as to actuate the motors 8, and the flowchart proceeds to Step S24.

In Step S24, whether or not the vehicle speed is greater than a predetermined vehicle speed A is judged, and in the event that the vehicle speed is judged as being greater than the predetermined vehicle speed A, in Step S25 the switch 10 is switched off to stop the motors 8 and the flowchart returns. On the contrary, in the even that in Step 22 it is judged that the full acceleration is not being taking place, or in the event in step 24 the vehicle speed is judged as being equal to or smaller than the predetermined speed A, the flowchart returns in either case.

Consequently, in response to the driver's wish to accelerate the vehicle, the vehicle can be switched over to the 4 wheel-drive mode to get the vehicle accelerated without any delay.

Next, referring to the flowchart shown in FIG. 5, a regenerative control will be described. In Step S30, when it is confirmed that there is nothing wrong with the system and thus the operating condition is established, in the following step S31, whether or not a deceleration is taking place is judged with brake sensors and a throttle sensor which are not shown.

In the event that in Step 31 it is judged that the deceleration is taking place, in Step 32 the motors 8 function as a generator, and only in the event that in Step 33 the 36V battery 11 and the 12V battery 13 for accessories are judged as being ready to receive, on condition that the switch 10 is being switched on, regenerative energy is supplied to the 36V battery 11 and the accessories battery 13 via the direct-current voltage converter 12. In addition, in here, what is meant by "being ready to receive" means that the battery 11 and the battery 13 for accessories can be charged in view of the residual capacities thereof.

In the event in Step 31 it is judged that the deceleration is not taking place, the flowchart returns. In the event that in Step S33 the battery 11 and the battery 13 for accessories are judged as not being ready to receive, in Step S34 the regeneration being taking place is stopped, and the flowchart returns.

Consequently, the regenerative energy can be collected from the rear wheels 7 without passing through a plurality of transmission means by the motors 8 which are not coupled to the engine 2 more efficiently than a case where the motor is coupled to the engine 2.

Next, a second mode of operation of the present invention will be described.

In the second embodiment of the invention, as shown in chain lines in FIG. 2, an ammeter 16 and a voltmeter 17 are provided on the ground side of the motor 8, and the ammeter 16 and voltmeter 17 are connected to the control unit 15. Whether or not there is anything abnormal with the motor 8 is judged based on output signals from the ammeter 16 and the voltmeter 17, and in the event that there is something abnormal with the motor 8, the control unit 15 switches off the switch 10 so as to stop the motors 8 for protection thereof.

Consequently, according to this second embodiment, a damage to the motor 8 can be limited to a minimum level.

In this case, since the battery 13 for accessories and the electric load 14 are supplied with electric power based on the output voltage of the generator 6 which is caused to step down to 12V, the battery 13 for accessories and the electric load 14 can function normally. Therefore, even if the motor 8 is stopped, a normal driving can be effected without any problem.

In addition, the present invention is not limited to the aforesaid modes of operation of the invention. For instance, the hybrid vehicle may be constructed such that the rear wheels are driven by the engine, while the front wheels are driven by the motors. In addition, although the output voltage of the generator is described as being 42V, the output voltage thereof does not have to be limited to 42V provided that assist can be rendered to the motors with an output voltage so determined. Moreover, the control flowcharts shown in FIGS. 3 to 5 are shown only as an example, and therefore the flowchart for various types of control is not limited thereto.

As has been described heretofore, generation can be effected by driving the generator through driving the engine and simultaneously with this operation, the second driving wheels can be driven with the generated power of the generator. Therefore, even when generation is being effected by the generator, there is provided an advantage that assist can be rendered to the engine by the motors. In addition, there is also provided an advantage that the degree of freedom in layout as a hybrid vehicle can be increased by disposing an engine and a generator at the font side of the vehicle and the motors at the rear side thereof.

In addition, since the motors can be actuated through generation at the first voltage which is higher than the second voltage, there is also provided an advantage that power loss can be reduced even with thick wires.

Moreover, since the motors are driven with the generated power of the generator, an amount of current taken from the first battery can be reduced, and therefore there is provided an advantage that the deterioration of the first battery can be reduced.

Furthermore, since the first voltage which is the generated voltage of the generator is made higher than the second voltage, a greater magnitude of generated power can be taken out with a generator of the same size or capacity, whereby there is provided an advantage that the generator can be made smaller in size, lighter in weight and lower in production costs to that extent.

Further, since electric power is supplied as normally via the direct-current voltage converter even when the motors are found abnormal, there is provided an advantage that the functions of the electric loads can be maintained as normally.

The present disclosure relates to the subject matter contained in Japanese patent application No. Hei.11-47245 filed on February 24 which is expressly incorporated herein by reference in its entirety.

What is claimed is:

1. A hybrid vehicle comprising:
    an engine driving first driving wheels;
    a generator adapted to be driven by said engine for generation at a first voltage;
    a first battery adapted to be charged with a generated power from said generator;
    a motor driving second driving wheels with a generated power from said generator;
    a direct-current voltage converter allowing the generated voltage to step down to a second voltage being lower than said first voltage;
    a second battery adapted to be charged with electric power by the voltage stepped down by said direct-current voltage converter;
    an electric load connected to said second battery and adapted to be supplied with the electric power by the voltage stepped down by said direct-current voltage converter; and
    a control unit judging whether or not a full acceleration is being applied on the basis of a variation of a throttle opening angle, and operating said motor during a period of full acceleration and stopping said motor when an actual vehicle speed exceeds a predetermined vehicle speed.

2. A hybrid vehicle as set forth in claim 1, wherein when said motor is detected as abnormal, the driving of said motor based on the generation of the generator is stopped.

3. A hybrid vehicle as set forth in claim 1, wherein said motor comprises a pair of motors corresponding to said second-driving wheels, respectively and said motors are disposed apart from said engine and said generator.

4. A hybrid vehicle as set forth in claim 1, wherein when the vehicle is judged as slipping, an output of said generator is increased in response to a slip distance.

5. A hybrid vehicle as set forth in claim, wherein when the vehicle is judged as slipping, an input of the motor is increased in response to a slip distance.

* * * * *